Dec. 6, 1949     C. F. HAUNZ     2,490,519
APPARATUS FOR MAKING LEAD OXIDE
Filed April 20, 1945     2 Sheets-Sheet 2
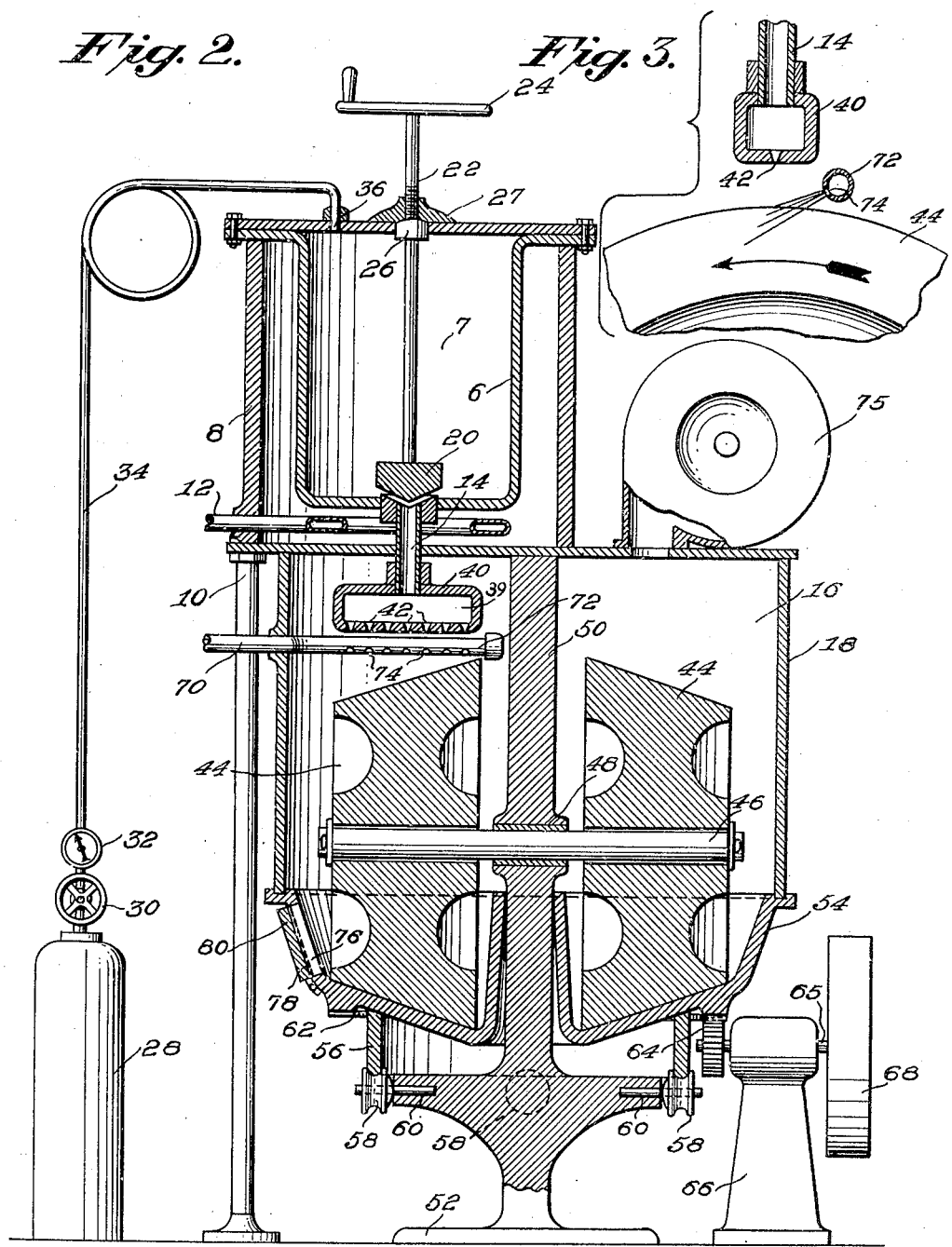

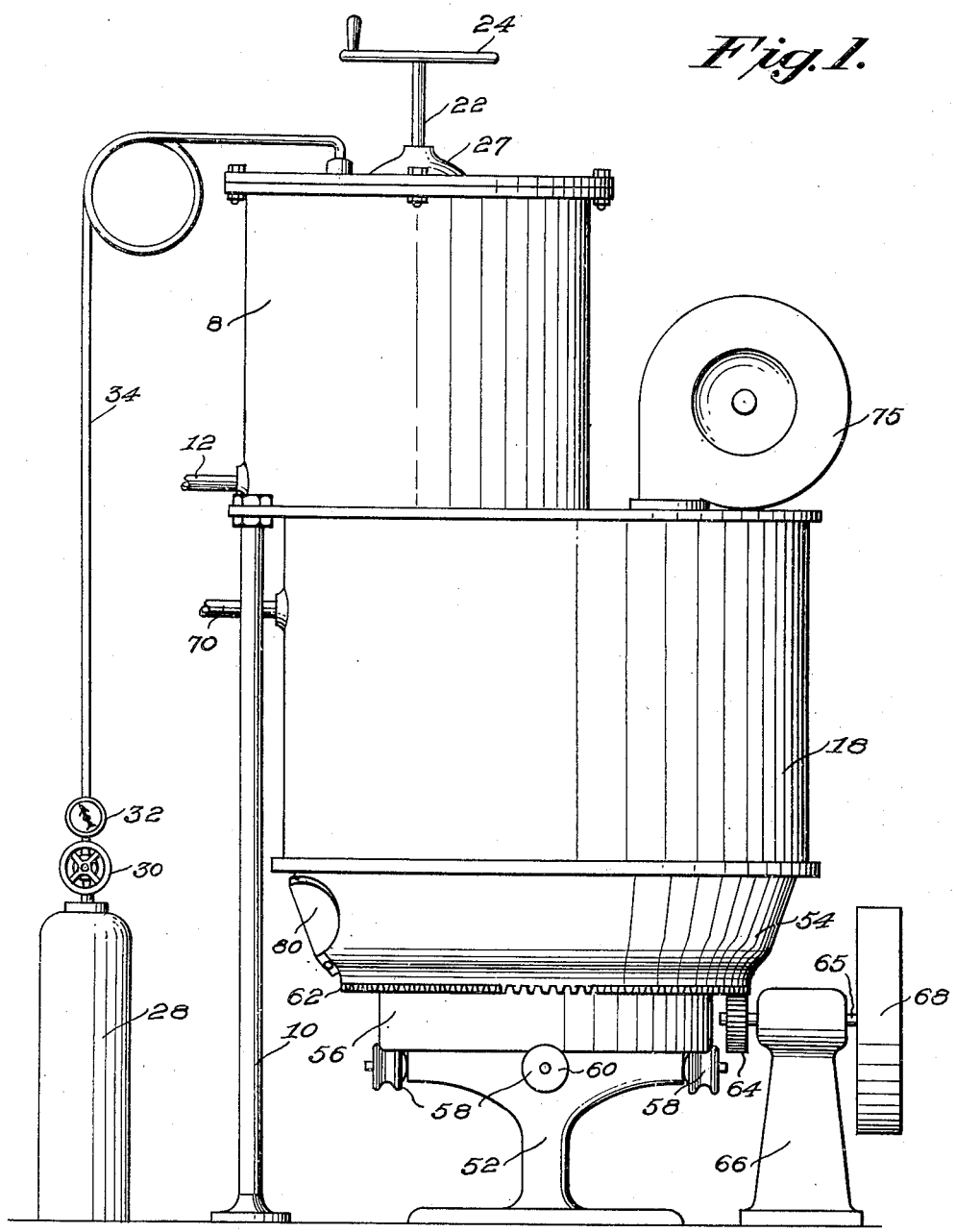

Patented Dec. 6, 1949

2,490,519

UNITED STATES PATENT OFFICE 2,490,519

APPARATUS FOR MAKING LEAD OXIDE

Charles F. Haunz, Kansas City, Mo.

Application April 20, 1945, Serial No. 589,389

6 Claims. (Cl. 23—252)

The present invention relates to lead oxide processes as well as apparatus for the practice of the same, and one primary object of the invention is to devise an improved process for the efficient production of the lead oxide required for use in storage batteries, and also as a base material for making other lead compounds.

Accordingly, one novel aspect of my invention is the provision of an improved process or method whereby low oxide compounds of lead, on the order of sub-oxide or $Pb_2O$, may be used for the manufacture of the desired active material for battery construction. In the carrying out of this purpose of the invention, a process has been devised wherein the lead in filamentary form is coated with a hydroxide film, thereby enabling the subsequent milling step of the process to be carried out without the formation of slugs or pellets in the resulting product.

Further features of the invention reside in the provision for atomizing, disintegrating and oxidizing effects under appropriate temperature and moisture conditions, and the coordination of such effects for obtaining the most efficient results as regards the end product.

It is a still further object of my invention to provide a practical and efficient form of apparatus for the satisfactory practice of my improved method or process.

With the foregoing general objects in view, the invention will now be described in detail by reference to the accompanying drawing illustrating one form of apparatus which is adapted for the practice of my improved process, after which those features and combinations deemed to be novel and patentable in this relation will be particularly set forth and claimed.

In the drawings—

Figure 1 is an elevational view illustrating a form of apparatus constructed and arranged for the purpose of practising my improved method or process;

Figure 2 is a vertical sectional elevation thereof; and

Figure 3 is a detail sectional view showing the metal and moisture feeding means intermediate the metal melting pot and the milling chamber.

It has heretofore been the general practice to employ mixtures composed principally of litharge or red lead as the active material in the construction of storage batteries of the lead acid type—the mixture being applied in the form of a stiff paste to the conductor and supporter grids or frames of the battery.

More recently it has been discovered that in lieu of the conventional oxides, other so-called low oxides of lead may be used, such as the sub-oxide $Pb_2O$, a blue-black amorphous powder, or the oxide $Pb_3O_2$, a brown amorphous powder, which are not only more economical and easier to produce, but have superior properties for the desired purpose as regards capacity and longer life of the battery structure, by virtue of a more efficient bonding action being obtained between the paste materials and the supporting grids or frames.

One very important advantage characterizing the use of the aforesaid sub-oxide materials is the fact that it has been found necessary to prepare in the first instance only the sub-oxide $Pb_2O$, since this passes over exothermally into the related brown product $Pb_3O_2$ upon ignition of only a small part of the main batch of the material; and that, moreover, without any ignition at all, the main batch comprised of the $Pb_2O$ has the property of passing over automatically into the brown powder product in the course of the operation of merely preparing the paste mixture.

Previous processes of preparing these two sub-oxide materials have been cumbersome and inefficient, since the operation involved the slow, noisy and comparatively expensive attrition method of treating masses of the lead metal in a tumbling mill for producing an analogous brown lead powder of relatively low oxygen and correspondingly high free lead content. However, the lead powder obtained by such operation, when milled to reduce the same to suitable comminuted form for use as active material, was found to possess the stubborn and objectionable tendency to unite and form lumps or slugs of the metal.

In my improved process I have succeeded in devising means for producing the black amorphous form of the oxide by an operational method which coordinates atomizing and disintegrating effects in a novel manner, along with oxidation of the lead and in conjunction with the application of appropriate moisture and control of the temperature conditions of the process.

In the accompanying drawings, illustrating one practical form of apparatus for the practice of my method, such apparatus is shown as comprising a suitable melting pot 6 surrounded by a furnace shell or housing 8 and supported by framework 10 over a gas burner structure 12. The chamber 7 provided by said melting pot is of a gas tight nature and provided with an outlet passage 14 communicating with the top of a milling chamber 16 within the drum or housing structure 18 below said melting pot 6. The outlet port or passage 14 is provided with a valve 20 operated by a valve stem or rod 22 having an exterior operating handle 24 and also provided with a valve element or plug 26 adapted to effect a tight seal at the bearing portion 27 with which the stem or rod 22 has operative screw-threaded engagement—as illustrated in Figure 2.

For maintaining an appropriate pressure over the surface of the metal in said chamber 7, a supply of neutral or inert gas, such as nitrogen, is provided in a cylinder 28 having a reducing valve 30 and conventional indicator 32, and a pipe connection 34 to the top of said chamber 7 as indicated at 36 in Figure 2.

The discharge passage 14 communicates with a chamber 39 in a head 40 whose lower wall is formed with a series of microscopic orifices 42 adapted to discharge the molten material across the face of one of a set of tapered rollers 44 which are carried by a horizontal shaft 46 mounted in a bearing 48 provided in an upright support 50 carried by a base member 52. Below their axes the rollers 44 are engaged by the bottom of a rotating milling pan 54 having a contour for conforming to the periphery of the rollers. The exterior of the bottom of said pan 54 is formed with an annular rib or flange 56 for supporting engagement with a series of idler rollers 58 journaled on horizontal spindles 60 also carried by the supporting structure 50. Moreover, the under face of the pan bottom is formed with an annular gear rack 62 designed for driving engagement with a suitable gear or pinion 64 fixed to a horizontal shaft 65 which is journaled in a suitable standard 66 and provided with a driving pulley 68 as shown in Figure 2.

A water supply pipe 70 is also arranged to maintain atomizing sprays or jets of water across the face of one of the rollers 44, for which purpose said pipe 70 terminates in a spray head 72 formed with jet orifices 74 in a series extending alongside and in advance of the orifices 42, and also entirely across the roller face.

A suitable blower 75, adapted to be driven in any conventional manner, is also mounted on top of the drum or housing structure 18, with the discharge outlet from said blower arranged in communication with the upper portion of the milling chamber 16, or above the rollers 44 therein, as represented in Figure 2.

The side wall of the pan member 54 is provided with an outlet opening 76 fitted with a fine gauze panel 78 and a movable closure 80, whereby intermittent tests may be made as to the grade or fineness of the material at various stages of the operation.

While I have illustrated only one melting pot unit it is apparent that the operation may be made substantially continuous by providing an additional unit or units arranged to operate and feed in the same manner as the melting pot 6.

In the operation of the process, a supply of pig lead, or of molten lead, is placed in the melting pot 6, where the metal is brought to a completely liquid state by the action of the burner member 12. In starting operation the valve 20 is elevated by means of the handle 24, whereby a gas-tight seal is also maintained at the bearing 27 by means of the valve or closure element 26. At the same time a gas pressure of upwards of 40 lbs. is maintained above the surface of the metal within the melting pot by means of the supply of nitrogen or other suitable inert gas admitted to the chamber 7 through the connection 34, with the result that the liquid metal is expelled through the orifices 42 in the form of a flat stream of film or filaments or flakes on to the wet periphery of one of the rollers 44.

The reaction following impact of the fine streamlets of the metal with the wet roller surface is in the nature of an explosion—the metal bursting into spiderlike structures on the order of snowflake crystals, and these forming in the presence of a suitable degree of both heat and moisture immediately become coated over with an external film of the hydroxide.

The great and important advantage of this reaction is now demonstrated in the following step of milling the flake material in the chamber 16, for I have found that the hydroxide coating or film enables this milling operation, under pressure, to be carried out with what may be termed isolating effect, i. e., in a manner which prevents the formation of slugs or pellets of the material.

This milling operation may be continued for a predetermined period, upwards of three hours, under the same uniform conditions as to temperature and moisture within the enclosed mill, and until tests of the material (as withdrawn through the outlet opening 76) show the required fineness of comminution along with the oxidation of the material which has continuously progressed by virtue of the contact of every particle thereof with with oxygen of the surrounding air and warm moisture.

This oxidation and accompanying effects or reaction can be properly coordinated by the maintenance of definite and appropriate temperature and moisture conditions within the enclosed mill; and with such proper coordination the air separation becomes unnecessary, with corresponding simplification of both the process and the apparatus required.

It has been found that with the foregoing process and a proportion of 100 lb. of lead and 10 to 30 lb. of water the desired quality of product is obtained in the shortest interval of operation. During the period of feeding of the lead and water (30 to 60 min.) the hydrated mixture in the milling chamber assumes a wet granular and somewhat lumpy mass of greyish color, while in the subsequent operation of milling this mass becomes gradually more pasty and lighter in color, and then progressively dryer and finer and of a greenish grey shade; but towards the end, as the drying action accelerates, the material goes over into a very dry powder form of black or bluish color, having all the desired properties suitable for use as battery oxide for both plates of a battery unit.

It may be pointed out that as the milling process continues the procedure involves practically a dry operation, since the supply of water becomes either absorbed as vapor by the metal, or (with the exception of the water of hydroxide) is evaporated by the mechanical action entailed in the carrying out of the process. Moreover the complete enclosing of the mechanism provides a form of apparatus and a working operation which are both sanitary and substantially dustless.

While I prefer the tapered design of milling rollers as illustrated, other specific forms of such rollers may be substituted, and these rollers may be employed in any desired number, according to conditions or requirements of the operation.

It will therefore be apparent that I have devised a novel and efficient method for the carrying out of the desired objects of my invention, as well as a most practical form of apparatus for performing the proposed method or process; and while I have illustrated and described what I now regard as the preferred mode of procedure as well as most efficient form of apparatus for practising the new process, I desire to be understood as expressly reserving the right to make such changes or modifications as may fairly fall within the spirit and scope of my invention as defined by the appended claims. For example, in addition to lead oxide materials, a similar process may be carried out for treating other metals in like manner for producing analogous oxide compounds.

Having thus described my invention, what I claim and desire to secure by Letters Patent is:

1. Apparatus for preparing lead oxide, comprising a milling chamber defined by a bottom rotatable pan, a side wall and a top wall, a vertically disposed support extending through said pan and said chamber, a roller rotatably supported by a horizontal shaft which in turn is supported by said vertically disposed support, the said roller having a relatively wide peripheral surface for cooperation with the inner wall of said pan in the milling operation, a melting pot supported above the top wall of said chamber, a horizontally disposed chambered head in said milling chamber and having a row of orifices in the vertical plane of said shaft, and a valve-controlled passage between said melting pot and said head chamber.

2. Apparatus according to claim 1, together with a spray head disposed between said roller and said head and having a row of jet orifices parallel with said row of orifices in said head wall and displaced from said plane, gas pressure means communicating with said melting pot, and an air blower communicating with said milling chamber.

3. Apparatus according to claim 1, wherein the exterior of said pan is supported on idler rollers rotably supported by said vertically disposed support, an annular gear rack on the bottom wall of said pan and a rotatable driven gear meshing with said rack for imparting rotation to said pan with a corresponding rotation of said roller about said shaft.

4. Apparatus according to claim 1, wherein the bottom wall of said pan is of frusto-conical form, a second roller mounted on said shaft with the two rollers disposed on opposite sides of said vertically disposed support, and the peripheral walls of said rollers conforming with the frusto-conical formation of the bottom wall of said pan.

5. Apparatus for preparing lead oxide, comprising a milling chamber having a top wall and a lead melting pot disposed above said milling chamber and supported on the top wall thereof, a pair of axially alined milling rollers rotatably supported in the chamber, a molten lead distributor disposed within the milling chamber and having a row of orifices in its bottom wall substantially in the vertical plane of the axes of said rollers and disposed above one of said rollers, a valve-controlled passage between the melting pot and distributor, and a horizontally disposed water spray pipe in said milling chamber and disposed adjacent to said plane.

6. The structure according to claim 5, together with a blower supported on the top wall of said milling chamber and above the other of said rollers, and an inert gas supply pipe communicating with the top of said melting pot.

CHARLES F. HAUNZ.

REFERENCES CITED

The following references are of record in the file of this patent:

UNITED STATES PATENTS

| Number | Name | Date |
| --- | --- | --- |
| 412,568 | Vaughn | Oct. 8, 1889 |
| 566,777 | Layng | Sept. 1, 1896 |
| 785,023 | Rowley et al | Mar. 14, 1905 |
| 829,173 | Sackett | Aug. 21, 1906 |
| 1,026,733 | Buigne | May 21, 1912 |
| 1,031,160 | Bailey | July 2, 1912 |
| 1,715,678 | Schneider | June 4, 1929 |
| 1,734,285 | Braselton | Nov. 5, 1929 |
| 2,017,150 | Haunz | Oct. 15, 1935 |
| 2,211,775 | Haunz | Aug. 20, 1940 |
| 2,233,302 | Aitken | Feb. 25, 1941 |
| 2,269,094 | Woodbridge | Jan. 6, 1942 |
| 2,347,131 | Seabury | Apr. 18, 1944 |
| 2,383,220 | Seabury et al. | Aug. 21, 1945 |

FOREIGN PATENTS

| Number | Country | Date |
| --- | --- | --- |
| 20,797 | Great Britain | 1904 series |
| 3,728 | Great Britain | 1912 series |
| 9,333 | Great Britain | 1914 series |
| 85,482 | Germany | Feb. 25, 1896 |
| 351,328 | Germany | Nov. 16, 1920 |